Jan. 31, 1961 F. C. PHELPS 2,969,918
SOLAR HEATING CONTROL SYSTEM
Filed Oct. 11, 1954 2 Sheets-Sheet 2
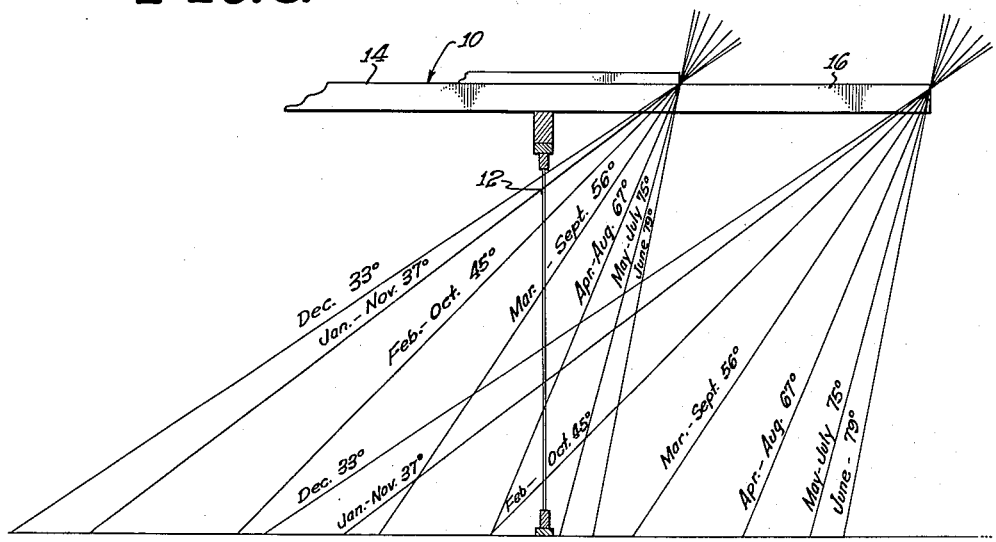
Fig. 3.
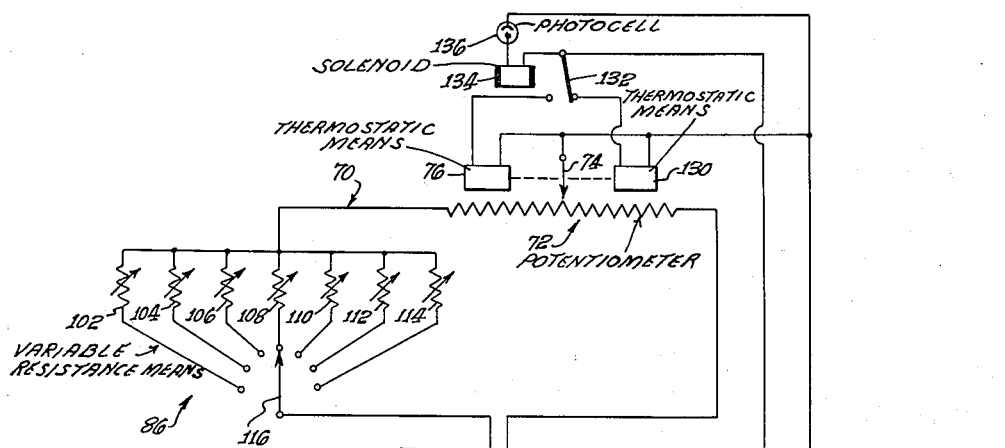
Fig. 4.
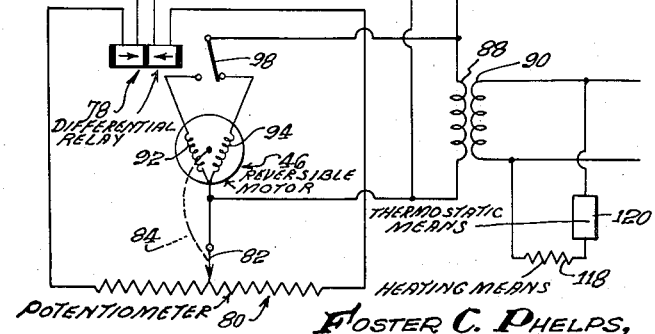
Foster C. Phelps,
INVENTOR.
By His Attorneys.
Harris, Kiech, Foster & Harris.

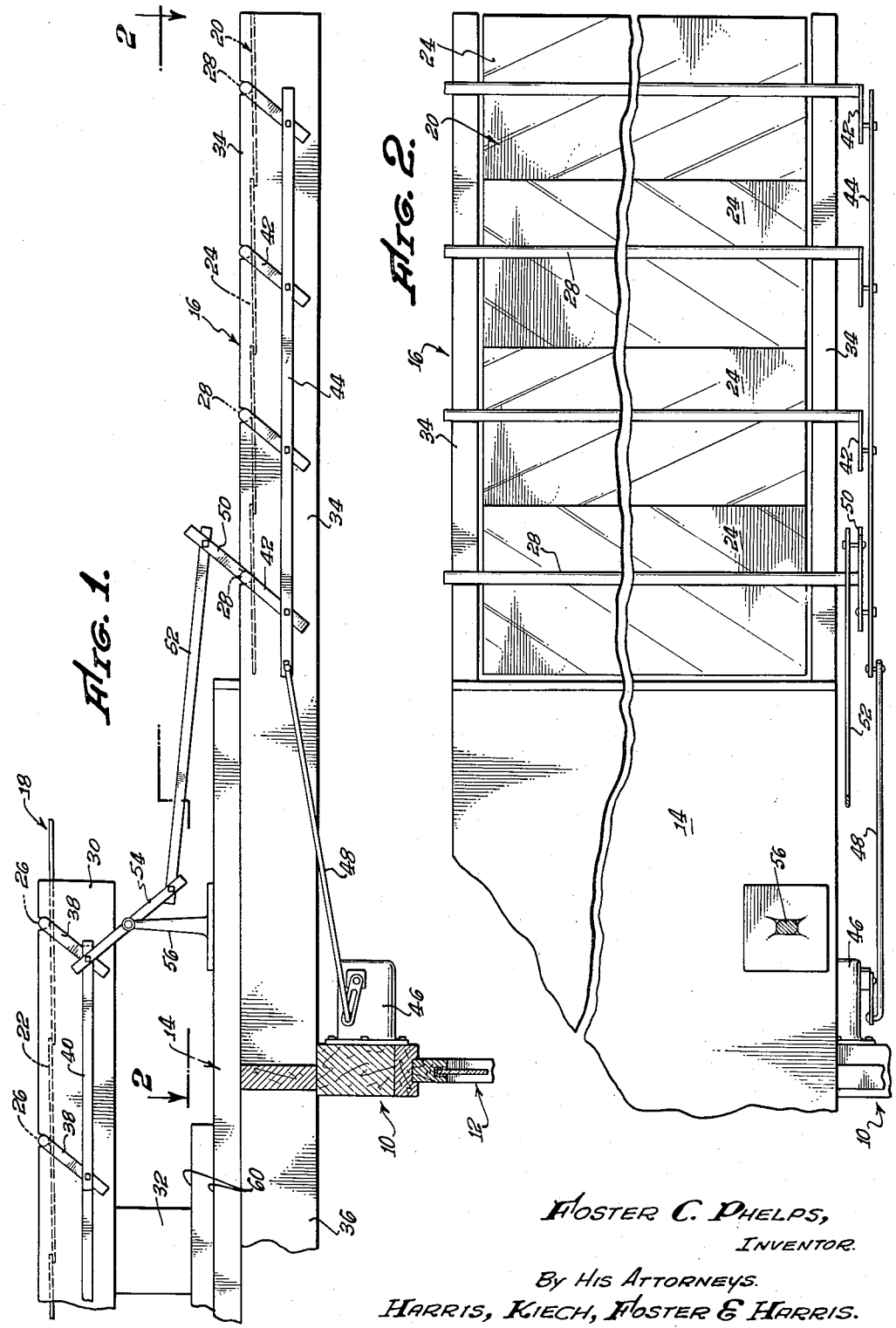

# United States Patent Office 2,969,918
Patented Jan. 31, 1961

2,969,918

SOLAR HEATING CONTROL SYSTEM

Foster C. Phelps, 4328 Troost Ave., North Hollywood, Calif.

Filed Oct. 11, 1954, Ser. No. 461,506

8 Claims. (Cl. 237—1)

The present invention relates in general to an apparatus or system for controlling the heating of a structure and, more particularly, to a control system for regulating the temperature within the structure with solar heating alone, or with a combination of solar and artificial heating, a primary object of the invention being to provide an improved control system for solar heating and for combined solar and artificial heating.

An important object of the invention is to provide a control system which involves heating the structure solarly as long as the temperature is below a first predetermined value, and heating the structure both solarly and artificially when the temperature is below a second predetermined value, the second predetermined value being lower than the first predetermined value so that artificial heating is employed only when solar heating is inadequate to maintain a desired temperature within the structure, whereby artificial heating of the structure is minimized, which is an important feature of the invention.

Another important object of the invention is to provide a solar heating control system which includes radiation control means located externally of the structure and movable between open and closed positions for regulating the solar heat radiation incident on the structure, the opening and closing of the radiation control means being effected by means responsive to the temperature within the structure.

More particularly, an object of the invention is to provide means responsive to the temperature within the structure for respectively opening and closing the radiation control means in response to temperatures within the structure below and above a predetermined value at such times when solar heat radiation is available.

Another object is to provide means for closing the radiation control means at night at times, e.g., during the winter, when the temperature is below some predetermined value so that heat losses from the structure are minimized when no solar heating is available.

Another object is to provide means for opening the radiation control means at night at times, e.g., during the summer, when the temperature is above some predetermined value so as to maximize heat losses to obtain cooling of the interior of the structure under such conditions.

Another object is to provide a control system wherein the means discussed in the two preceding paragraphs overrides the means for respectively opening and closing the radiation control means, at times when solar heat radiation is available, in response to temperature departures below and above a predetermined value.

Another important object of the invention is to provide a radiation control means comprising a plurality of louvers adapted to be positioned at different angles to vary the amount of heat transfer therethrough and, specifically, to vary the amount of solar heat radiation incident on the structure.

Another object is to provide means for varying the maximum angle of the louvers with variations in the angle of the sun's rays from the horizontal, i.e., the altitude of the sun's rays, so that maximum solar heating is obtained when the louvers are fully open.

Another object is to provide means for limiting the maximum louver angle to one of a plurality of values respectively corresponding to the angles of the sun's rays at different times of the year for a particular time of day and a particular latitude from the equator.

Another object is to provide a control system having a circuit which includes means for varying the louver angle and which is adapted to be unbalanced by temperature departures from a predetermined value to energize the louver-angle-varying means in one direction or the other, depending upon the direction of temperature departure from the predetermined value.

Another object of the invention is to provide a structure having a heat-radiation-absorbing external surface, such as a black surface, outwardly of which is located a radiation control means movable between open and closed positions and having a heat-radiation-reflecting external surface, such as a white or silvered surface. With this construction, when the radiation control means is open, a maximum amount of heat is absorbed by the heat-radiation-absorbing surface of the structure, whereas, when the radiation control means is closed, a maximum amount of solar heat radiation is reflected away from the structure by the heat-radiation-reflecting surface of the radiation control means, which are important features of the invention.

Another important object of the invention is to provide a structure having a wall transparent to solar heat radiation and having an overhang projecting outwardly from the top of the wall, the overhang carrying a radiation control means which is movable between open and closed positions in response to departures of the temperature within the structure below and above, respectively, a predetermined value so as to appropriately vary the amount of solar heat radiation incident on said radiation-transparent wall, which may be formed of glass, for example.

Another object is to provide such an overhang-wall relationship wherein the radiation control means carried by the overhang comprises a plurality of louvers the maximum angle of which corresponds with the angle of the sun's rays as hereinbefore discussed.

The foregoing objects, advantages and features of the present invention, together with numerous other objects, advantages and features thereof which will become evident hereinafter, may be attained with the exemplary embodiment of the invention illustrated in the accompanying drawings and described in detail hereinafter. Referring to the drawings:

Fig. 1 is a fragmentary sectional view of a structure having the solar heating control system of the invention associated therewith;

Fig. 2 is a view taken along the arrowed line 2—2 of Fig. 1;

Fig. 3 is a diagrammatic view illustrating the relationship at latitude 34° north between the angles of the sun's rays at different times of the year and the structure shown in Figs. 1 and 2 of the drawings; and Fig. 4 is a schematic diagram of the electrical circuitry of the heating control system of the invention.

Referring first to Figs. 1 and 2 of the drawings, fragmentarily illustrated therein is a structure 10 having a wall 12 transparent to solar heat radiation, the wall 12 preferably being of glass, for example. The structure 10 also includes a roof 14 having an overhang 16 which projects outwardly from the top of the wall 12, the structure 10 being so positioned that the wall 12 faces in the direction of the sun at some time during the day. For maximum solar heating, the wall 12 preferably faces in a generally southerly direction, although it may face in an easterly direction, or a westerly direction, if maximum solar heating is desired in the morning, or afternoon. Of course, the foregoing directions apply to a structure located north of the equator insofar as a southerly facing of the wall 12 is concerned.

The roof 14 and the overhang 16 respectively carry radiation control means 18 and 20 movable between open and closed positions to vary the solar heat radiation incident on the roof 14 and the wall 12, respectively. The radiation control means 18 and 20 respectively include pivoted louvers 22 and 24, the louvers 22 being carried by shafts 26 and the louvers 24 being carried by shafts 28. In the particular construction shown, the shafts 26 and 28 are located intermediate the horizontal edges of the louvers 22 and 24 so that the louvers are substantially balanced so far as gravitational forces are concerned. The shafts 26 are carried by rafter-like frame members 30 spaced above the roof 14 by supporting means 32, and the shafts 28 are carried by extensions 34 of normal roof rafters 36. The shafts 26 terminate in arms 38 which are ganged together by a link 40 pivotally connected thereto, the shafts 28 being provided with similar arms 42 ganged together by a link 44 pivotally connected thereto. The arms 38 and 42 are so angled relative to the louvers 22 and 24 that the weights of the arms and louvers tend to bias the louvers toward positions intermediate their fully closed, i.e., horizontal, positions and their fully open, i.e., vertical, positions.

A reversible motor 46, preferably an electric motor, is connected to the link 44 by a link 48 to open and close the louvers 24. An arm 50 on one of the shafts 28 has pivotally connected thereto a link 52 connected to one end of a lever 54 carried by a fulcrum 56, the fulcrum being between the ends of the lever and the other end of the lever being pivotally connected to the link 40. As will be apparent, with this construction, the motor 46 opens the louvers 22 and 24 in unison, and closes them in unison.

One feature of the present invention is that the upper surface 60 of the roof 14 is rendered as heat-radiation absorbing as possible as by making the surface 60 black, as by painting, or otherwise. Thus, when the louvers 22 are open, maximum solar heating is attained within the structure 10, which is an important feature. The upper surfaces of the louvers 22, i.e., the surfaces thereof which are uppermost when these louvers are closed, are preferably rendered highly reflecting, as by painting them white, by painting them with aluminum paint, or by otherwise rendering them reflecting. Thus, when the louvers 22 are closed, minimum solar heating of the structure 10 occurs, which is an important feature. Similar considerations are also applicable to the louvers 24 carried by the overhang 16.

Referring now to Fig. 3 of the drawings, super-imposed on the structure 10 are lines indicating the angles of the sun's rays for different months of the year, the angles shown in Fig. 3 being those prevailing at noon on the twenty-first days of the respective months at a latitude of 34° north of the equator. As will be apparent from Fig. 3 of the drawings, maximum solar heating by way of the radiation-transmitting wall 12 is attained in December with the length of overhang shown, and no solar heating is attained in June, which are important features of the invention. In order to obtain maximum solar heating when such maximum is desired, it is necessary to limit the maximum angles of the louvers 22 and 24 to values equal to the angle of the sun's rays so that the louvers are parallel to the sun's rays when fully open. For convenience, the maximum louver angles may be selected as those shown in Fig. 3 of the drawings, which, as indicated, are those prevailing at noon on the twenty-first days of the respective months at 34° north latitude. Under such conditions, maximum solar heating is attained at noon. However, the angles of the sun's rays prevailing at other times of day may be utilized as a base if maximum heating is desired at a time of day other than noon. Alternatively, means may be provided for making the maximum louver angle coincide with the angle of the sun's rays at all times. However, the control system hereinafter described is based on a maximum louver angle corresponding to the noon sun angles shown in Fig. 3 as a matter of convenience.

Referring now to Fig. 4 of the drawings for a discussion of the electrical control system of the solar heating apparatus of the invention and a consideration of the operation of the solar heating apparatus, the numeral 70 designates generally a bridge circuit which includes a potentiometer 72 having a movable contact 74 controlled by a temperature-sensing device or thermostatic means 76 located within the structure 10 to respond to the temperature therein. One end of the potentiometer 72 is connected through one side of a differential relay 78 to one end of a potentiometer 80 having a movable contact 82 driven by the motor 46, as indicated by the broken line connection 84. The other end of the potentiometer 80 is connected through the other side of the differential relay 78 and a variable resistance means 86 to the other end of the potentiometer 72. The contact 74 is connected to one end of a transformer secondary 88 having a primary 90, the other end of the transformer secondary being connected to the contact 82 and to windings 92 and 94 of the motor 46. The differential relay 78 operates a switch 98 which connects either the winding 92 or the winding 94 in the circuit, thereby operating the motor 46 in either direction to open or close the louvers 22 and 24.

Considering the operation of the control circuit as thus far described, if the thermostatic means 76 senses a temperature below a predetermined temperature at which it is desired to maintain the interior of the structure 10, it unbalances the bridge circuit 70 so as to energize the motor 46 in a direction to open the louvers 22 and 24, such opening movement continuing until the contact 82 has been moved sufficiently to restore the bridge circuit to balance. The reverse takes place in the event that the temperature is too high, the louvers 22 and 24 being moved toward their closed positions.

Considering now the variable resistance means 86, it is shown as including variable resistors 102, 104, 106, 108, 110, 112 and 114 any one of which may be connected in the bridge circuit 70 by a movable contact 116. The resistance of the variable resistor 102 is so adjusted that it limits the maximum louver angle to, for example, 33° in December for the particular set of conditions shown in Fig. 3 of the drawings. Similarly, the variable resistors 104, 106, 108, 110, 112 and 114 are so adjusted that they limit the maximum louver angles to those values shown in Fig. 3 of the drawings for January-November, February-October, March-September, April-August, May-July and June, respectively. As will be apparent, the variable resistors of the variable resistance means 86 may be so set that the maximum louver angle will not be exceeded despite travel of the contact 74 to one end of the potentiometer 72. Preferably, the overall sensitivity of the bridge circuit 70 is so selected that even a small departure in the temperature within the structure 10 below the desired predetermined value will produce the maximum louver angle, determined by the corresponding one of the variable resistors 102, 104, 106, 108, 110, 112, and 114. However, the sensitivity of the bridge circuit 70 may also be so selected that the maximum louver angles will not be attained unless a relatively large temperature departure below the predetermined value exists. The movable contact 116 of the variable resistance means 86 may be operated in any suitable manner. For example, it may be moved manually from time to time, or it may be moved automatically by any suitable apparatus such as an annual clock. It will be understood that while separate resistors have been shown in the variable resistance means 86, a potentiometer could be substituted therefor if desired.

Associated with the solar heating system hereinbefore described is an artificial heating system which, as a matter of convenience, has been shown as comprising electrical heating means 118 connected across the transformer primary 90 and connected in series with a temperature-sensing means or thermostatic means 120. As will be understood, the heating means 118 may be other than electrical, such as gas furnace means, oil furnace means, and the like. An important feature of the invention is that the thermostatic means 120 is set to energize the heating means 118 at a predetermined temperature lower than the predetermined temperature at which the thermostatic means 76 is set to energize the solar heating system, i.e., open the louvers 22 and 24. Consequently, artificial heating of the structure 10 does not begin until the temperature within the structure has dropped below the temperature for which the thermostatic means 76 is set by a predetermined decrement, thereby insuring maximum utilization of solar heating and minimizing artificial heating as an economy measure, which is an important feature of the invention. As an example, the thermostatic means 120 may be set to energize the heating means 118 at a temperature of 70° F. while the thermostatic means 76 may be set to fully open the louvers at a temperature of 72 to 73° F., although other temperature values may be selected.

As will be apparent, with the system as thus far described, if the thermostatic means 76 were to control at all times, the louvers 22 and 24 would be opened on winter nights in an attempt to gain solar heat and would be closed on hot summer nights in an attempt to shut out unwanted solar heat. In the first instance, excessive cooling of the interior of the structure 10 would be the result, thereby requiring additional heating by the artificial heating means 118, and in the second instance, the effect would be to curtail heat loss from the structure 10 under conditions when it would be desirable to produce cooling of the interior of the structure. To overcome this, the thermostatic means 76 controls only during the day, a temperature-sensing means or thermostatic means 130 assuming control at night, or in cloudy weather. Preferably, the thermostatic means 130 is located within the structure 10.

A switch 132 controlled by a solenoid 134 determines whether the thermostatic means 76 or the thermostatic means 130 controls the bridge circuit 70, the thermostatic means 76 controlling when the solenoid 134 is energized and the thermostatic means 130 controlling when the solenoid 134 is de-energized. The solenoid 134 is shown as controlled by a photocell 136 which produces energization of the solenoid during the day, or during the day when the sun is shining, depending upon the sensitivity of the photocell, the photocell being shown connected in the circuit very schematically as a matter of convenience.

Considering the operation of this portion of the control system, it will be apparent that as long as the light intensity is sufficient to energize the photocell 136, the thermostatic means 76 controls the bridge circuit 70 so that a decrease in temperature below the predetermined value causes opening of the louvers 22 and 24, while an increase in the temperature above the predetermined value causes closing of the louvers. At night, the photocell 136 is de-energized to de-energize the solenoid 134, thereby placing the thermostatic means 130 in control of the bridge circuit 70. Under such conditions, if the temperature falls below the predetermined value, the thermostatic means 130, since it operates the reverse of the thermostatic means 76, causes the louvers 22 and 24 to close so that the louvers 22 provide a dead air space above the roof 14 to insulate the structure 10 against heat loss. Conversely, if the temperature at night is above the predetermined value, the thermostatic means 130 causes the bridge circuit 70 to energize the motor 46 in a direction to open the louvers 22 and 24, whereby heat can escape from the structure 20 by way of the roof 14 and the louvers 22 thereabove. Thus the heating control system of the invention heats the structure 10 solarly by day and minimizes or maximizes heat losses by night, depending upon whether the temperature within the structure 10 is below or above the desired value. The minimizing of heat losses in this manner at night is of particular importance from the economy standpoint since it minimizes the necessity for artificial heating of the structure 10, in conjunction with the economy attained by setting the thermostatic means 120 at a lower value than the thermostatic means 76. Preferably, the thermostatic means 130 is set for approximately the same temperature as the theremostatic means 76.

It will be understood that while the hereinbefore described switchover between day and night operation has been illustrated as photoelectrically effected, this can be accomplished in other ways as well. For example, the switch 132 may be controlled by a clock which moves the switch 132 between its two positions in the same manner as the photocell 136 does.

Although I have described an exemplary embodiment of my invention herein, it will be understood that various changes, modifications and substitutions may be incorporated in this embodiment without departing from the spirit of the invention as defined by the claims hereinafter appearing.

I claim as my invention:

1. In a heating control system, the combination of a structure providing a space adapted to be heated artificially and solarly; solar heating means for heating said space solarly; artificial heating means for heating said space artificially; means for regulating the solar heating of said space, including first temperature sensing means responsive to the temperature within said space, and including radiation control means externally of said structure and controlled by said first temperature sensing means for varying the quantity of solar heat radiation impinging on said structure, said radiation control means including a plurality of movable louvers adapted to be positioned at different angles to vary the radiation transmitted thereby, and said radiation control means including means for varying the angle of said louvers with variations in the altitude of the sun's rays; and means connected to said artificial heating means for regulating the artificial heating of said space, including second temperature sensing means responsive to the temperature within said space, said first temperature sensing means responding to a higher temperature than said second temperature sensing means.

2. In a solar heating control system, the combination of: a structure; a plurality of horizontal louvers located externally of said structure and movable to different angles from the horizontal to vary the amount of transmitted solar heat radiation incident on said structure; means for varying the angle of said louvers from the horizontal; and means for limiting the maximum angle of said louvers from the horizontal to a value equal to the altitude of the sun's rays.

3. A solar heating control system as defined in claim 2 wherein said angle-varying means includes temperature sensing means responsive to the temperature of the interior of said structure.

4. In a solar heating control system, the combination of: a structure; a plurality of horizontal louvers located externally of said structure and movable to different angles from the horizontal to vary the amount of solar heat radiation transmitted to said structure; means for varying the angle of said louvers from the horizontal; and means for limiting the maximum angle of said louvers from the horizontal to one of a plurality of values respectively corresponding to the altitudes of the sun's rays at different times of the year for particular times of day and a particular latitude from the equator.

5. In a solar heating control system, the combination of: a structure; radiation control means externally of said structure and movable between open and closed positions for regulating the transmission of solar heat radiation to said structure; means for respectively opening and closing said radiation control means as the temperature within said structure decreases below and increases above a predetermined value during the day; means for opening said radiation control means at night in the event of a temperature above a predetermined value; and means for closing said radiation control means at night in the event of a temperature below a predetermined value.

6. In a solar heating control system, the combination of: a structure providing a space adapted to be heated solarly and having a solar-heat-radiation-absorbing surface bounding said space; radiation control means externally of and adjacent said solar-heat-radiation-absorbing surface and movable between open and closed positions and having a solar-heat-radiation-reflecting outer surface, said radiation control means including a plurality of horizontal louvers adapted to be positioned at different angles from the horizontal to vary the heat radiation transmitted thereby; means for varying the angle of said louvers from the horizontal, including temperature sensing means within said space; and means for varying the angle of said louvers from the horizontal with variations in the altitude of the sun's rays.

7. A solar heating control system, including: a structure having a wall transparent to solar heat radiation and positioned to receive said radiation, and having an overhang projecting generally horizontally outwardly from the top of said wall; generally horizontally-oriented radiation control means carried by said overhang and movable between open and closed positions for varying the transmission of said radiation to said wall; and means, including temperature sensing means, for respectively opening and closing said radiation control means in response to departures of the temperature within said wall below and above a predetermined value, said radiation control means including a plurality of louvers adapted to be positioned at different angles from the horizontal, said means for opening and closing said radiation control means including means for varying the angle of said louvers from the horizontal with variations in the altitude of the sun's rays.

8. A solar heating control system as defined in claim 7 wherein the means last defined includes means for positioning said louvers at one of a plurality of selected angles from the horizontal respectively corresponding to the altitudes of the sun's rays at different times of the year and at particular times of day and a particular latitude from the equator.

References Cited in the file of this patent

UNITED STATES PATENTS

| | | |
|---|---|---|
| 246,626 | Morse | Sept. 6, 1881 |
| 302,215 | Tucker | July 15, 1884 |
| 1,386,781 | Harvey | Aug. 9, 1921 |
| 1,488,345 | Jenkins | Mar. 25, 1924 |
| 1,696,003 | Harvey | Dec. 18, 1928 |
| 1,888,522 | Ward | Nov. 22, 1932 |
| 2,030,350 | Bremser | Feb. 11, 1936 |
| 2,213,894 | Barry | Sept. 3, 1940 |
| 2,271,120 | Grant | June 27, 1942 |
| 2,288,465 | Knudsen | June 30, 1942 |
| 2,396,338 | Newton | Mar. 12, 1946 |
| 2,489,879 | Grebe | Nov. 29, 1949 |
| 2,529,621 | Mayo | Nov. 14, 1950 |
| 2,559,869 | Gay | July 10, 1951 |
| 2,595,905 | Telkes | May 6, 1952 |
| 2,625,930 | Harris | Jan. 20, 1953 |
| 2,749,581 | McCormick | June 12, 1956 |

OTHER REFERENCES

Architectural Record, F. W. Dodge Corp., 10 Ferry St., Concord, N.H., April 1949, pp. 135–138.

American Builder, September 1952, pp. 86, 87, Simmons-Boardman Publishing Corp., Emmett St., Bristol, Conn.

American Builder, August 1952, page 85, idem.